UNITED STATES PATENT OFFICE.

GEORGE W. CHAMBERS, OF TALLADEGA, ALABAMA.

IMPROVEMENT IN MEDICAL COMPOUNDS.

Specification forming part of Letters Patent No. 118,686, dated September 5, 1871.

*To all whom it may concern:*

Be it known that I, GEORGE W. CHAMBERS, of Talladega, in the county of Talladega and State of Alabama, have invented a new and useful Improvement in Medical Compound; and I do hereby declare that the following is a full, clear, and exact description thereof, which will enable others skilled in the art to make and use the same.

My invention has for its object to furnish an improved medical compound or blood-purifier for the cure of debility, enlargement and ulceration of glands, ulcers, eruptions of the skin, syphilitic diseases, affection of the kidneys, &c.; and it consists in the medical compound composed of the ingredients hereinafter set forth.

This compound is composed of the following ingredients, viz.: Fraxinus Americana, (cortex,) sassafras radices, (cortex,) sumach nigrum, (cortex,) quercus rubrum, (cortex,) each three ounces; phytolacca, (radix,) rhus radicans, (radix,) each two drams; podophyllum, (radix,) one ounce; diluted alcohol, three gallons; iodide of potassium, one ounce to a gallon of the mixture. These ingredients are prepared and mixed in the ordinary manner.

Having thus described my invention, I claim as new and desire to secure by Letters Patent—

A composition of matter, formed of the ingredients and for the purpose above specified.

GEO. W. CHAMBERS.

Witnesses:
   E. A. COWEN,
   H. H. HAMILL.